United States Patent [19]

Gemmell-Murdoch

[11] 4,416,311

[45] Nov. 22, 1983

[54] TREE HARVESTER

[75] Inventor: Andrew Gemmell-Murdoch, Glastonbury via Gympie, Australia

[73] Assignee: Murdoch Logging Industries Pty. Ltd., Gympie, Australia

[21] Appl. No.: 285,117

[22] PCT Filed: Dec. 1, 1980

[86] PCT No.: PCT/AU80/00102
§ 371 Date: Jul. 21, 1981
§ 102(e) Date: Jul. 21, 1981

[87] PCT Pub. No.: WO81/01496
PCT Pub. Date: Jun. 11, 1981

[30] Foreign Application Priority Data

Dec. 5, 1979 [AU] Australia ............................ PE1620

[51] Int. Cl.³ .......................................... D01G 23/08
[52] U.S. Cl. ................................... 144/3 D; 144/2 Z
[58] Field of Search ..................... 144/2 Z, 3 D, 33 S, 144/336, 339

[56] References Cited

U.S. PATENT DOCUMENTS 3,995,671 12/1976 Wirt ..................................... 144/3 D
4,147,194 4/1979 Johnson .............................. 144/3 D

FOREIGN PATENT DOCUMENTS 896320 3/1972 Canada .

Primary Examiner—W. D. Bray
Attorney, Agent, or Firm—Schwartz, Jeffery, Schwaab, Mack, Blumenthal & Koch

[57] ABSTRACT

A tree harvester of the type having a grapple assembly, shear assembly and de-limbing assembly where the grapple assembly and the de-limbing assembly are mounted on respective telescopically slidable carriers. Cables connect the de-limbing assembling (or grapple assembly) to the grapple carrier (or de-limbing carrier) to move the de-limbing assembly (or grapple assembly) along its carrier at substantially the same velocity as the relative velocity between the two carriers. The grapple assembly and de-limbing assembly may delimb two tree trunks in a single operation, both tree trunks being severed by the shear assembly into logs of substantially uniform length.

12 Claims, 12 Drawing Figures

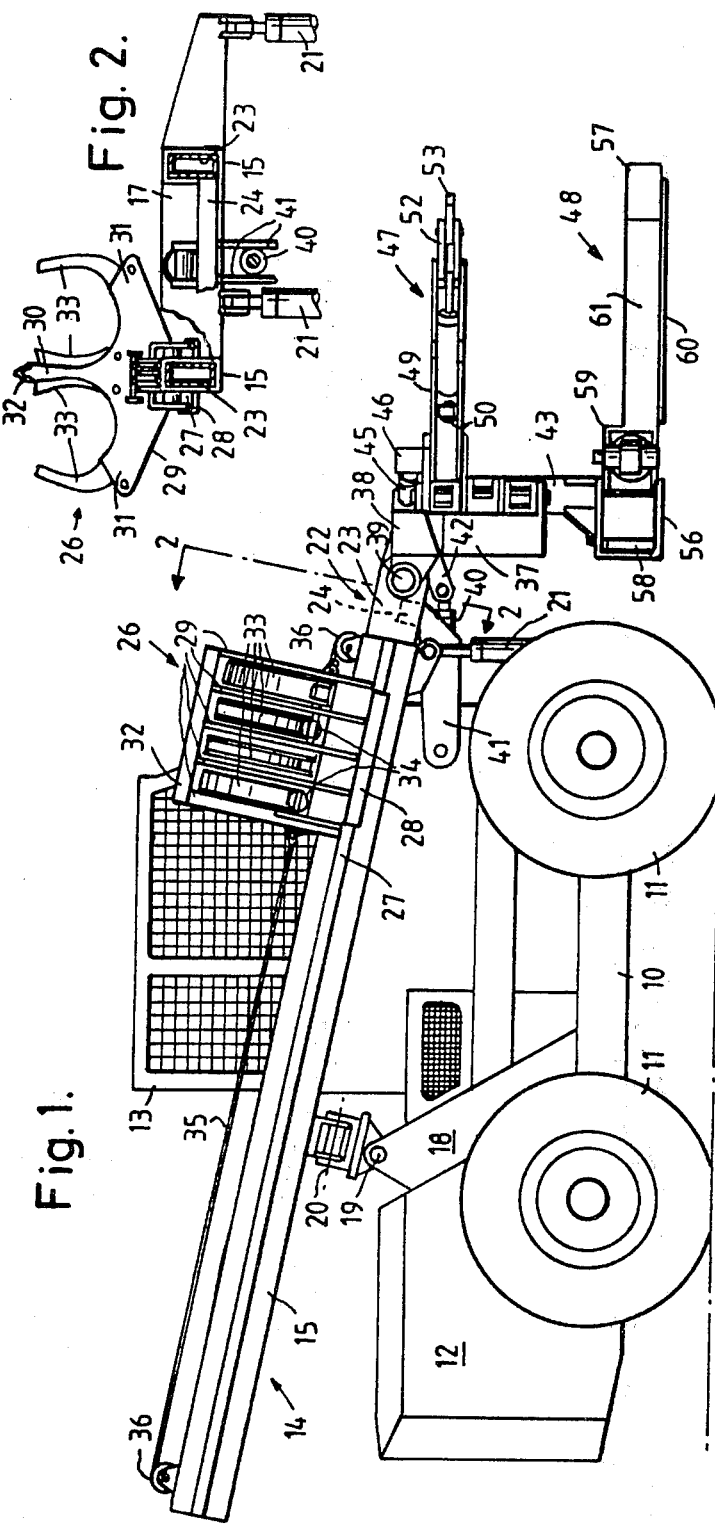

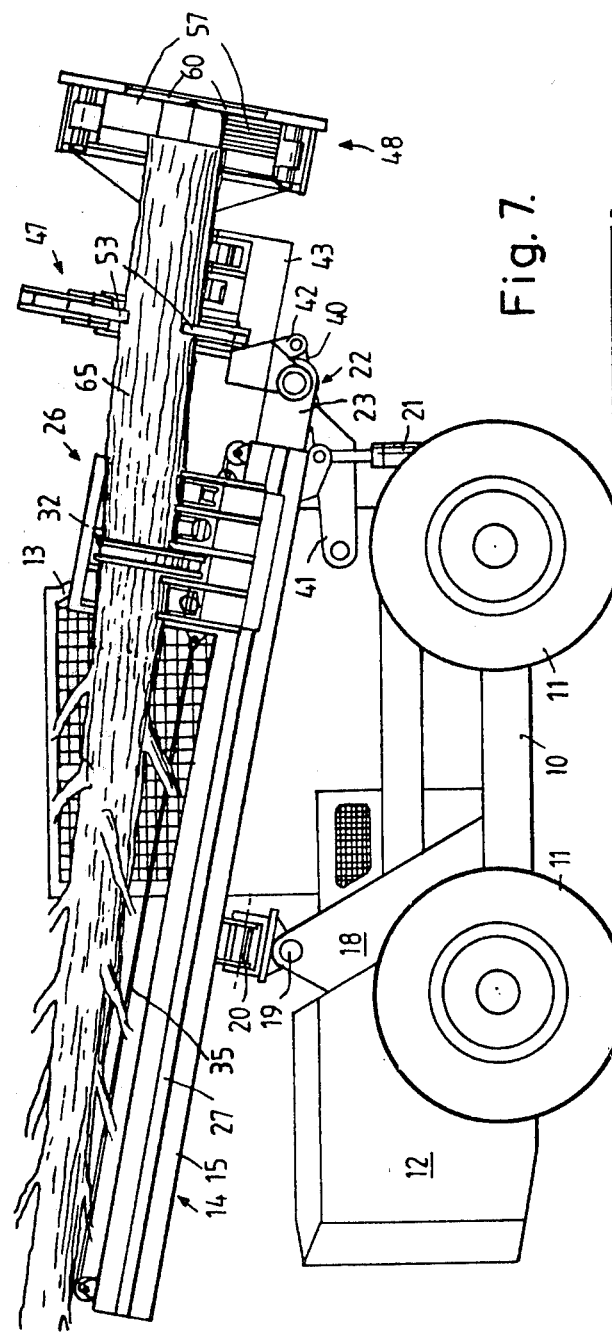
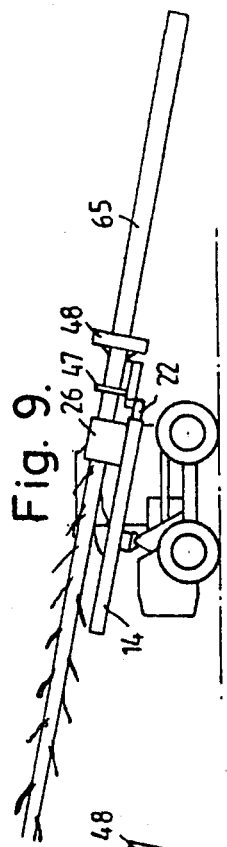
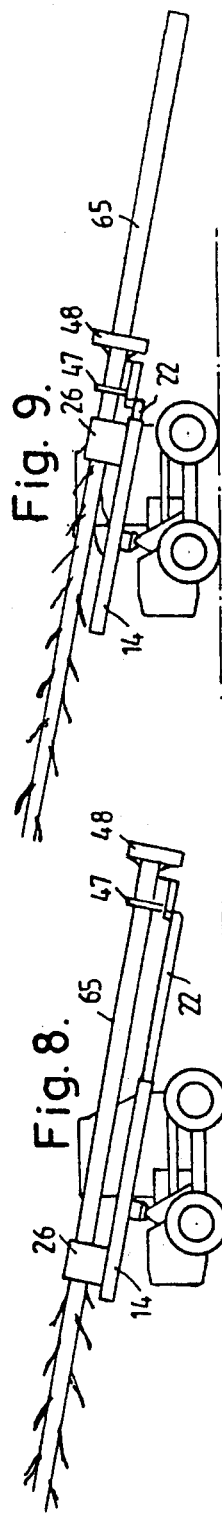

TREE HARVESTER

BACKGROUND OF THE INVENTION

1. Field of the Invention

This invention relates to tree harvesters.

2. Description of the Prior Art

There are a large number of tree harvesters available in the forestry and logging industries. The main disadvantage with such harvesters are that they are extremely expensive and are out of the reach of the small owner-operator. These operators usually have to rely on two small machines—a fellow-buncher and a de-limber, each mounted on a separate prime mover.

Two prime movers are expensive to purchase, operate and maintain and if one machine fails, the other must be left idle until the first is repaired.

Another major problem with known machines is that they are extremely bulky and cumbersome and can only operate along an out-row when thinning a forest and so can only thin one or two rows on either side of the outrow.

BRIEF SUMMARY OF THE INVENTION

The general object of the present invention is to provide a tree harvester which is particularly compact, and simple and economical to manufacture and operate, and will very efficiently de-limb tree trunks and cut them into logs of substantially uniform length.

The invention resides broadly in a tree harvester of the type having a grapple assembly for releasably gripping a tree trunk, a shear assembly for severing the tree trunk, a de-limbing assembly for engaging releasably about the tree trunk, and means for moving the de-limbing assembly in the direction away from the grapple assembly to strip limbs from the trunk, characterized in that:

means are provided for simultaneously moving the grapple assembly and the de-limbing assembly in opposite directions away from, or towards, each other.

Preferred features and embodiments of the present invention will become apparent to the skilled addressee from the following description; the scope of the invention being defined in the appended claims.

BRIEF DESCRIPTION OF THE SEVERAL VIEWS OF THE DRAWINGS

In the drawings:

FIG. 1 is a side elevation of a tree harvester according to the invention,

FIG. 2 is a section along line 2—2 in FIG. 1,

FIG. 7 is a side elevation of the machine with trees cut and placed on the de-limber, FIGS. 8 and 9 are small-scale diagrammatic views of the machine showing the de-limbing and log-cutting operations.

Figure 3:
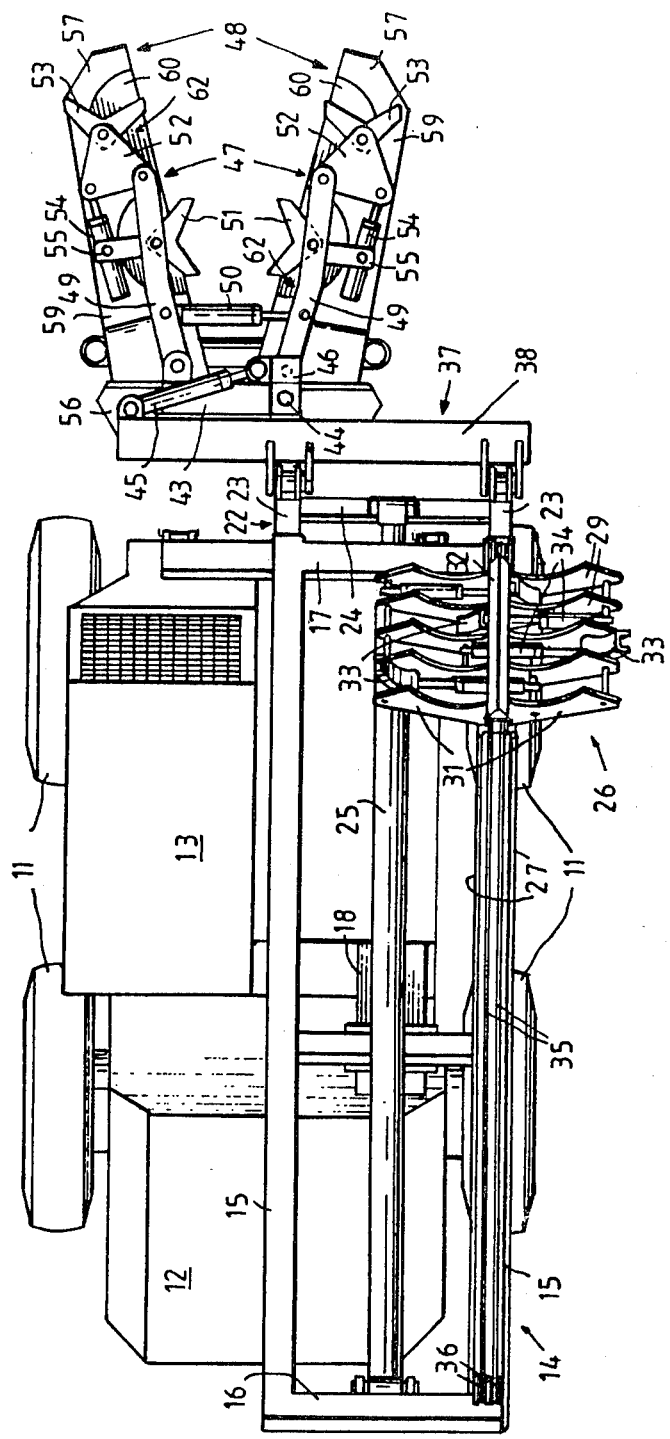
FIG. 3 is a plan view of the tree harvester.

The tree harvester shown in FIGS. 1 to 9 has a chassis 10 on four wheels 11 driven by an engine within a housing 12, a driver's cabin 13 being on the left of the chassis. On the right of the chassis, a de-limber carrier 14 having two parallel tubular side members 15 interconnected by a rear member 16 and a front member 17 is supported by a standard 18 so that the carrier 14 is pivotal about a transverse axis at 19 and also about a longitudinal axis at 20. The front of the de-limber carrier 14 is supported by a pair of hydraulic rams 21 so the angle of the carrier to horizontal can be adjusted.

A grapple and shear carrier 22 has two tubular side members 23 slidable in the tubular side members 15 of the de-limber carrier 14 and rigidly interconnected by a front member 24. The grapple and shear carrier 22 may be telescopically advanced and retracted by a hydraulic ram 25, its cylinder being fixed to the rear member 17, its piston passing through the front member 17 of the de-limber carrier and being secured to the front member 24 of the grapple and shear carrier 22.

A de-limber assembly 26 is slidably mounted on the right-hand side member 15 of the de-limber carrier 14, being roller-mounted on rails 27 and retained thereon by keepers 28. The assembly consists of a number of similar parallel plates 29 each with a central upright 30 with a pair of curved wings 31 extending to either side of its bottom, the tops of the uprights 30 being fixed under an angled divider 32. At each side of the assembly, a pair of oppositely directed curved de-limber blades 33 are provided, each between a pair of plates 29 and capable of being swung by a hydraulic ram 34 to open position, as shown in FIGS. 1, 2 and 3, or to closed position, as shown in FIG. 7, to encircle a tree trunk lying on the de-limber assembly. Cables 35 are secured to front and back of the assembly, passed over front and back pulleys 36 on the side member 15 and into that side member, and fixed to the enclosed side member 23 of the grapple and shear carrier 22 so that when the grapple and shear carrier 22 is advanced by the ram 25, the de-limber assembly is correspondingly retracted, and vice versa.

A tilting frame 37 has its horizontal top member 38 pivoted to the front ends of the grapple and shear carrier side members 23 about a transverse axis at 39, and may be swung forwards and up from its normal vertical position by a hydraulic ram 40, its cylinder connected between a pair of plates 41 secured to the front member 24 of the carrier 22 and a pair of lugs 42 secured to the tilting frame 27.

The tilting frame top member 38 is extended to the left of the grapple and shear carrier 22, and in front of this extended part is a T-shaped swinging frame 43, its top being pivoted at the right-hand side, at 44, to the tilting frame 37 and capable of being swung through a right angle by a hydraulic ram 45 connected between the top member 38 of the tilting frame and a bracket 46 fixed on the swinging frame 43.

A grapple assembly 47 is mounted on the top of the swinging frame 43, and a shear assembly 48 is mounted on its bottom, both normally extended forwards.

The grapple assembly has a pair of arms 49, each consisting of two similar members one above the other, pivoted about parallel axes to the sides of the top of the swinging frame 32 and movable towards or away from each other by a hydraulic ram 50. Pivoted between the upper and lower members of each arm is a V-shaped rear grapple 51, and one corner of a triangular bellcrank 52, consisting of similar upper and lower parts, and which has pivoted at a second corner a V-shaped front grapple 53. A small hydraulic ram 54 has its cylinder pivoted between a pair of projections 55 from the arm 49, its piston connected to the third corner of the bell-crank 52 for swinging the bell-crank to move the front grapple 53 inwardly or outwardly.

The shear assembly 48 includes a pivot box 56 fixed to the bottom of the swinging frame, and a pair of shear arms 57 engaged by pivots 58 and extending through the open front of the pivot box. Each of the shear arms has an upper plate 59 and a lower shear blade 60 interconnected by a side and front plate 61. The upper plate is formed with two semi-circular openings 62 so that, when the two shear arms 57 are swung towards each other by a hydraulic ram 63, to bring the shear blades 60 together, the corresponding openings 62 of the two shear arms form circular openings.

Figure 6:
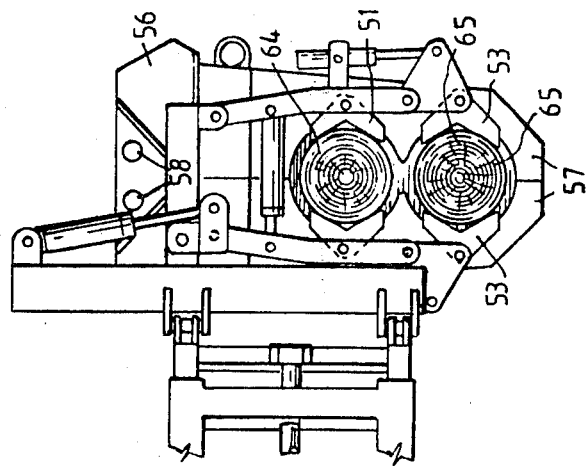
FIGS. 4, 5 and 6 are plan views of the front part of the machine at different stages of tree harvesting.
Figure 4:
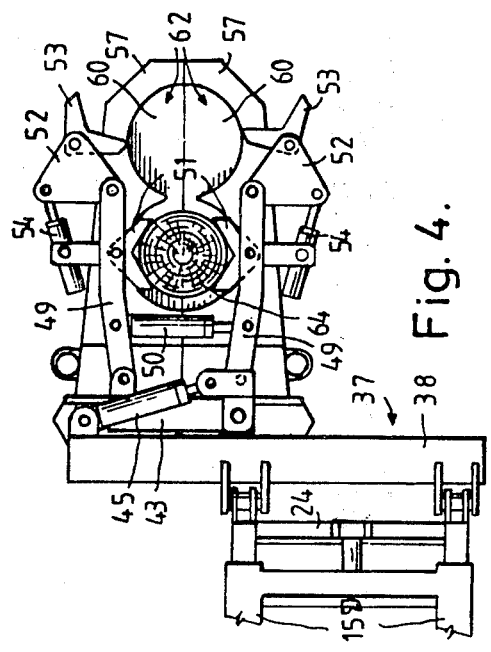
Figure 5:
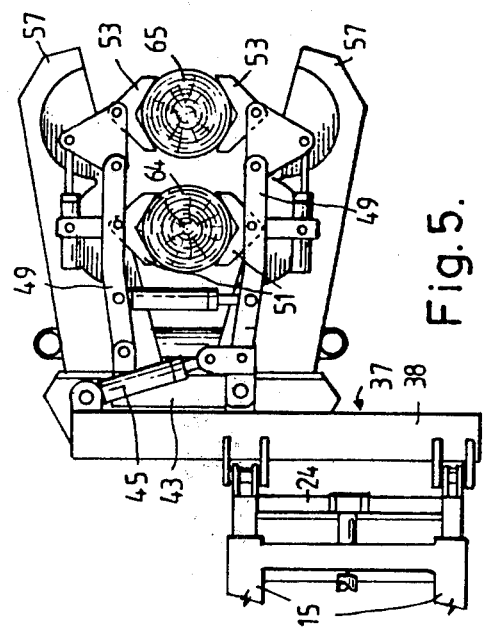

In use the tree harvester is advanced to a tree with the shear assembly 48 close to the ground, the pivotal mounting of the de-limber carrier 14 about longitudinal and transverse axes, and the pivotal mounting of the tilting frame 37 facilitating this despite ground slope. The grapple assembly arms 49 and the shear arms 57 are spread apart as shown in FIG. 3 so the butt of the tree is received between them. The grapple arms 49 are brought together so the rear grapples 51 grip the tree trunk, indicated at 64, and the shear arms 57 are brought together to cause the shear blades 60 to sever the tree close to the ground, the trunk being held firmly, as shown in FIG. 4. The shear arms 57 are then separated, the rear grapples 51 maintaining the firm hold of the tree trunk 64, and the harvester is advanced to a second tree. The front grapples 53 are then moved to oprative position, as shown in FIG. 5, to hold the second tree trunk 65, and the shear arms 57 are again brought together to sever the second tree. The two tree trunks 64 and 65 are then firmly held by the rear and front grapples and have their severed butts engaged in the circular openings formed by the openings 62 of the shear arm upper plates 59. The shear assembly 48 may then be raised, and the ram 45 extended to cause the swinging frame 43 through a right angle, together with the grapple assembly 47 and shear assembly 48, and the two trees 64 and 65, as shown in FIG. 6.

The tilting frame 37 is then swung forwards and up by the hydraulic ram 40 so the two trees are swung back and down to fall upon the de-limber assembly 26, being separated by the divider 32, so each lies across the wings 31 to one side of the assembly (see FIG. 7). The hydraulic rams 34 are operated to cause the de-limber blades 33 to move to closed positions so that they, with the wings 31, encircle the tree trunks.

The hydraulic ram 25 is extended to advance the grapple and shear carrier 22, the grapple assembly 47 maintaining its hold on the tree butts; and at the same time the de-limber assembly 26 is retracted. The de-limber blades 33 strip the branches from the tree trunks for a distance equal to the combined travel of grapple assembly and de-limber assembly, as shown in FIG. 8.

The grapple assembly arms 49 are then separated to release the hold of the grapples on the two tree trunks but the de-limber arms 33 retain their hold on them, and the grapple and shear carrier 22 is retracted, the de-limber assembly 26 being correspondingly advanced, so that the de-limbed parts of the tree trunks are advanced out in front of the harvester as shown in FIG. 9. The grapples 51 and 53 are re-engaged with the tree trunks and the shear blades 60 are brought together to sever the delimbed parts of the tree trunks, which fall freely to the ground. The shear arms 57 are separated, and the process described is repeated, to de-limb and sever further sections of the tree trunks. In this way, trees may be quickly severed, de-limbed and cut into logs of similar length.

Figure 10:
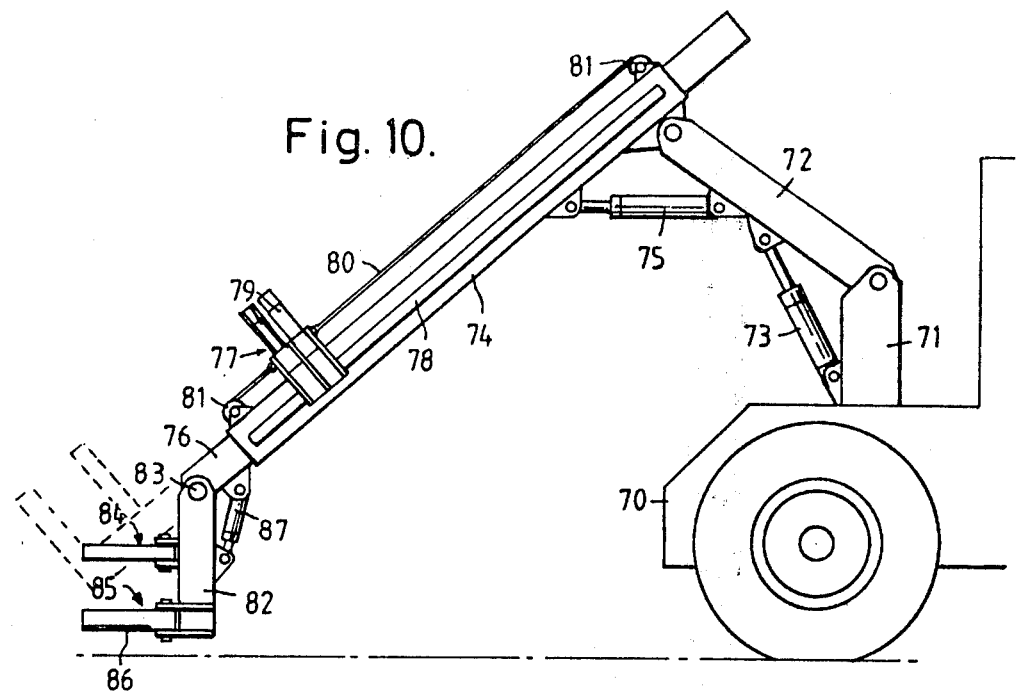
FIG. 10 is a side elevation of a tree harvester according to another embodiment of the invention.

In the embodiment of the invention shown in FIG. 10, a vehicle 70 is fitted with a turret 71 rotatable by any suitable mechanism, and pivoted to it is a boom 72 which may be raised or lowered by a hydraulic ram 73. Pivoted to the boom is a de-limber carrier 74 consisting of a single tubular member of which the angle to horizontal may be adjusted by a hydraulic ram 75. A tubular grapple and shear carrier 76 is telescopically slidable in the de-limber carrier, and may be advanced or retracted by a suitable hydraulic ram (not shown).

A simple de-limber assembly 77 is slidable on the de-limber carrier, being roller-mounted on rails 78. This assembly, for de-limbing one tree trunk at a time, requires only two simple curved de-limber blades 79 which may be brought hydraulically to open or closed positions. As before described, cables 80 from front and back of the de-limber assembly 77, passing over front and rear pulleys 81 on the de-limber carrier and made fast, within this carrier 74 to the grapple and shear carrier 76, ensure that when the grapple and shear carrier is advanced, the de-limber assembly 77 is retracted.

A tilting frame 82 pivoted about a transverse axis 83 to the front of the grapple and shear carrier 76 is provided with a forwardly extending grapple assembly 84, capable of being operated to engage and hold a single tree trunk, and a shear assembly 85 having a pair of blades 86 for severing the tree trunk. The tilting frame 82 may be swung up to the position shown in broken outline by means of a hydraulic ram 87.

This harvester may be used to grip and sever a single tree trunk, swing it over to fall on the de-limber assembly 77, and to de-limb the trunk and cut it into logs of similar length, generally as before described.

Figure 11:
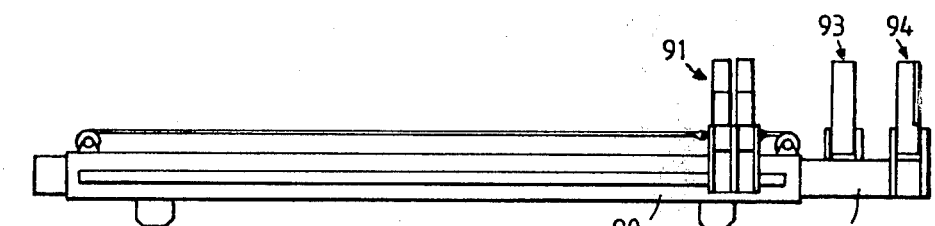
FIG. 11 is a side elevation of a further modification of the invention.

In the embodiment of FIG. 11, a de-limber carrier 90 and de-limber assembly 91 are as before described with reference to FIG. 10, and again the grapple and shear carrier 92 is slidable in the de-limber carrier by means of a hydraulic ram. However, in this form of the invention the grapple assembly 93 and the shear assembly 94, instead of being mounted on a tilting frame, are mounted directly on the front end of the grapple and shear carrier 92. This apparatus is for de-limbing trees which have already been felled, and for cutting them into logs of uniform length, and the trees are lifted onto the apparatus in any suitable way, engaged by the grapple assembly and de-limber assembly, which are then moved in opposite directions to strip limbs from part of the tree. The grapple assembly is then disengaged and retracted as the still engaged de-limber assembly is advanced, the shear assembly then being operated to sever a de-limbing log, and so on. This apparatus may be mounted on a truck and arranged to deposit the de-limbed logs into a trailer drawn by the truck.

Figure 12:
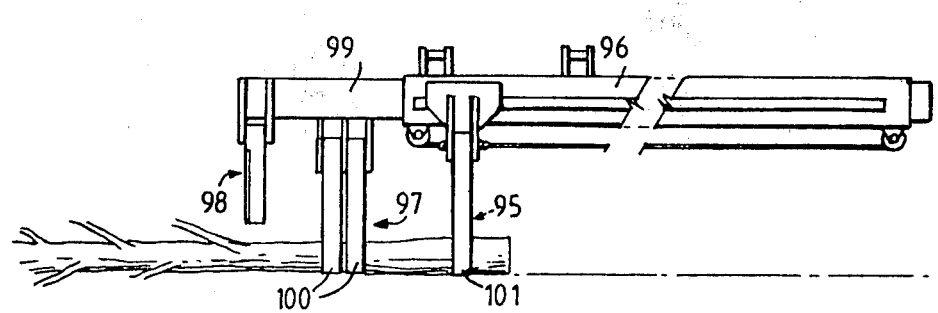
FIG. 12 is a side elevation of a still further form of the invention.

The embodiment shown in FIG. 12 is similar to that of FIG. 11 except that it is inverted (and may be hung from lifting arms on a tractor) and the position of the grapple and de-limber are reversed, so that the grapple assembly 95 extends downwardly from the grapple carrier 96, and the de-limber 97 and the shear assembly 98 extend down from the de-limber and shear carrier 99. The de-limber blades 100 and the grapple arms 101 are longer than the arms of the shear assembly 98, and are made to engage, lift and grip a felled tree. The de-limber and shear carrier is extended by a hydraulic ram and the grapple assembly 95 moves along the grapple carrier 96 to pull the tree trunk through the de-limber 97. The shear assembly is closed and the portion of the tree trunk supported by the grapple assembly 95 and de-limber 97 is severed by the shear assembly. The resultant log may then be deposited on a stockpile by opening the grapple assembly and de-limber. This operation is then repeated on the remaining length of the tree trunk to de-limb the tree trunk, cut it into logs of substantially uniform length.

A modified form of the harvester illustrated in FIGS. 1 to 9 may be used for trees which have their lower limbs close to the ground. One example of such trees is *Pinus Radiata*.

The modifications include reducing the distance between the grapple assembly 47 and shear assembly 48 and the provision of de-limbing blades on the upper and lower faces of the grapple arms 49. The harvester approaches the tree with both the grapple assembly 47 and shear assembly 48 opened as previously described, but with the shear assembly 48 spaced e.g. 1 meter above the ground. The grapple assembly 47 and shear assembly 48 are partially closed so that the grapple arms 49 and shear blades 60 only have a small clearance with the trunk of the tree. The grapple and shear carrier 22 is raised and lowered and the lower limbs (e.g. to a height of 2 meters above the ground) are removed by the de-limbing blades on the grapple arms and shear blades 60 of the shear assembly 48. Similar modifications may be made of the grapple assembly 84 of the embodiment illustrated in FIG. 10 to enable it to be used to harvest this type of tree.

It will be readily apparent to a skilled addressee that many variations or modifications may be made to the embodiments herein described and illustrated without departing from the scope of the present invention as defined in the appended claims.

I claim:

1. A tree harvester comprising:
   a de-limbing carrier:
   a grapple carrier slidably mounted on said de-limbing carrier for longitudinal movement relative to said de-limbing carrier;
   a grapple assembly mounted on said grapple carrier for releasably gripping a tree trunk;
   a shear assembly for severing the tree trunk;
   a de-limbing assembly, movably mounted on said de-limbing carrier, for engaging releasably about the tree trunk;
   and
   moving means connected to said grapple assembly and said de-limbing assembly for simultaneously moving said grapple assembly relative to said de-limbing assembly in a direction away from, or towards, each other, said moving means including a first means for longitudinally moving said grapple carrier and grapple assembly in a first direction relative to said de-limbing carrier and a second means interconnecting said de-limbing assembly and said grapple carrier to move said de-limbing carrier as said first means moves said grapple carrier in the first direction relative to said de-limbing carrier.

2. A tree harvester as claimed in claim 1, wherein said second means moves the de-limbing assembly along the de-limbing carrier at substantially the same relative velocity as said relative velocity between the grapple carrier and the de-limbing carrier.

3. A tree harvester as claimed in claim 1 or 2, wherein said shear assembly is mounted on said grapple carrier on an opposite side of said grapple assembly to said de-limbing assembly.

4. A tree harvester as claimed in claim 1 or 2, wherein, the grapple carrier includes:
   at least one tubular member slidably mounted on said de-limbing carrier; and
   a tilting member pivotally mounted on said tubular member for pivotal movement about a substantially horizontal axis, said grapple assembly being mounted on the tilting member; and
   a tiling ram connected to said tilting member to pivotally move said tilting member relative to said tubular member.

5. A tree harvester as claimed in claim 4 wherein the grapple carrier further includes:
   a swinging frame pivotally mounted on said tilting member for pivotal movement about an axis transverse to said horizontal axis, said grapple assembly being mounted on the swinging frame; and
   a swinging ram connected to said swinging frame to swing the swinging frame relative to the tilting frame.

6. A tree harvester as claimed in claim 1 or 2, wherein the grapple assembly includes:
   a pair of pivotally mounted grapple arms;
   a rear grapple on each grapple arm;
   a triangular bell crank pivotally mounted on each grapple arm;
   a front grapple pivotally mounted on each bell crank;
   a first hydraulic ram interconnecting the grapple arms to move the rear grapples between an open position and a closed position; and
   a second hydraulic ram on each grapple arm connected to a respective bell crank to move the front grapples between an opened position and a closed position.

7. A tree harvester as claimed in claim 1 or 2, wherein the de-limbing carrier includes:
   at least one tubular member connected to support said grapple carrier; and
   a pair of longitudinal rails along the tubular member.

8. A tree harvester as claimed in claim 7, wherein the de-limbing assembly includes:
   a body mounted on rollers on said longitudinal rails;
   at least one pair of de-limbing blades pivotally movable on the body between an opened position to receive a tree trunk and a closed position to de-limb the tree trunk; and
   at least one hydraulic ram connected to said de-limbing blades to open and close the de-limbing blades.

9. A tree harvester as claimed in claim 8, wherein:
   the body comprises a set of parallel, spaced plates each with a central upright between a pair of curved wings, the body being arranged to receive a pair of tree trunks substantially side by side; and
   the de-limbing blades are mounted on two pairs of de-limbing arms, each de-limbing arm being pivotally mounted between an adjacent pair of plates, the de-limbing assembly being arranged to simultaneously de-limb a pair of tree trunks.

10. A tree harvester as claimed in claim 1 or 2, wherein the second means includes:
    a first cable and a pulley connected at one end of said de-limbing carrier, said first cable being connected at one end to one end of the de-limbing assembly, passing around said pulley and being connected at its other end to the grapple carrier; and a second cable and a second pulley connected at another end of said de-limbing carrier, said second cable being connected at one end to the other end of the de-limbing assembly, passing around said second pulley and being connected at its other end to the grapple carrier.

11. A tree harvester as claimed in claim 1 or 2, wherein said harvester further comprises:

a chassis;

a standard on said chassis, the de-limbing carrier being mounted on said standard on the chassis of the tree harvester for pivotal movement about a longitudinal axis and about a transverse axis;

and at least one hydraulic ram interconnecting the chassis and the de-limbing carrier for pivotal movement about the said axes.

12. A tree harvester as claimed in claim 1 or 2, wherein said harvester further comprises:

a chassis;

a turret mounted for rotation about a vertical axis on said chassis of said tree harvester;

a boom having one end pivotally mounted to the turret for pivotal movement about a horizontal axis;

a hydraulic ram interconnecting the turret and the boom to raise or lower the boom, the de-limbing carrier being pivotally mounted at the other end of the boom;

and a hydraulic ram interconnecting the de-limbing carrier and the boom to pivotally move the de-limbing carrier relative to the boom.

* * * * *